US012548520B2

(12) United States Patent
Lim et al.

(10) Patent No.: US 12,548,520 B2
(45) Date of Patent: Feb. 10, 2026

(54) DISPLAY DEVICE, METHOD OF DRIVING THE SAME, AND ELECTRONIC DEVICE

(71) Applicant: Samsung Display Co., LTD., Yongin-si (KR)

(72) Inventors: Sang-Uk Lim, Yongin-si (KR); Jonghee Kim, Yongin-si (KR); Hyuk Kim, Yongin-si (KR); Seunghyun Park, Yongin-si (KR); Doo-Young Lee, Yongin-si (KR); Boyong Chung, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/197,988

(22) Filed: May 16, 2023

(65) Prior Publication Data

US 2024/0096283 A1 Mar. 21, 2024

(30) Foreign Application Priority Data

Sep. 19, 2022 (KR) ........................ 10-2022-0117815
Oct. 19, 2022 (KR) ........................ 10-2022-0135100

(51) Int. Cl.
*G09G 3/36* (2006.01)
*G09G 3/20* (2006.01)
(Continued)

(52) U.S. Cl.
CPC ......... *G09G 3/3258* (2013.01); *G09G 3/2096* (2013.01); *G09G 3/3233* (2013.01); *G09G 3/3275* (2013.01); *G09G 2300/0842* (2013.01); *G09G 2310/08* (2013.01); *G09G 2320/0233* (2013.01); *G09G 2320/0257* (2013.01);
(Continued)

(58) Field of Classification Search
CPC .. G09G 3/3258; G09G 3/2096; G09G 3/3233; G09G 3/3275; G09G 2300/0842; G09G 2310/08; G09G 2320/0233; G09G 2320/0257; G09G 2320/045;
(Continued)

(56) References Cited

U.S. PATENT DOCUMENTS

2002/0050973 A1* 5/2002 Takaoka .............. G09G 3/3696 345/100
2005/0179627 A1 8/2005 Hayafuji et al.
(Continued)

FOREIGN PATENT DOCUMENTS

JP H0379176 A 4/1991
KR 100894606 B1 4/2009

OTHER PUBLICATIONS

Extended European Search Report for Application No. 23197961.8-1210 dated Feb. 5, 2024.

*Primary Examiner* — Lunyi Lao
*Assistant Examiner* — Jarurat Suteerawongsa
(74) *Attorney, Agent, or Firm* — CANTOR COLBURN LLP

(57) ABSTRACT

A display device includes a display panel including pixels, a gate driver which sequentially applies scan signals to pixel rows including the pixels at a scan frequency, a data driver which applies data voltages to the pixels, a power voltage generator which applies a power voltage to the pixels, and a timing controller which sets a ripple frequency of the power voltage to deviate from the scan frequency by a predetermined reference ratio or more.

23 Claims, 12 Drawing Sheets

(51) Int. Cl.

| | |
|---|---|
| ***G09G 3/3233*** | (2016.01) |
| ***G09G 3/3258*** | (2016.01) |
| ***G09G 3/3275*** | (2016.01) |

(52) U.S. Cl.
CPC . *G09G 2320/045* (2013.01); *G09G 2330/021* (2013.01); *G09G 2330/028* (2013.01)

(58) Field of Classification Search
CPC ....... G09G 2330/021; G09G 2330/028; G09G 3/3696; G09G 3/36
See application file for complete search history.

(56) References Cited

U.S. PATENT DOCUMENTS

| | | | | |
|---|---|---|---|---|
| 2005/0237001 | A1* | 10/2005 | Hayafuji .............. | G09G 3/3233<br>315/169.2 |
| 2007/0152929 | A1* | 7/2007 | Chan .................. | H05B 41/3927<br>345/87 |
| 2016/0189613 | A1* | 6/2016 | Kim ..................... | G09G 3/3291<br>345/82 |
| 2018/0158427 | A1* | 6/2018 | Kawabuchi ....... | G02F 1/136286 |
| 2018/0233078 | A1* | 8/2018 | Park ......................... | G09G 3/20 |
| 2020/0111439 | A1* | 4/2020 | Kim ..................... | G09G 3/3614 |
| 2021/0110751 | A1* | 4/2021 | Choi .................... | G09G 3/3225 |
| 2022/0149730 | A1* | 5/2022 | Nam ..................... | H02M 3/285 |

* cited by examiner

FIG. 6

| DF | 60Hz |
|---|---|
| RF (kHz) | SF:97.1kHz<br>SF*2:194.2kHz<br>SF*3:291.3kHz |
| 145 | NOTHING |
| 155 | NOTHING |
| 165 | NOTHING |
| 175 | WEAK |
| 185 | STRONG |
| 195 | STRONG |
| 205 | MEDIUM |
| 215 | WEAK |
| 225 | NOTHING |
| 235 | NOTHING |
| 245 | NOTHING |
| 255 | NOTHING |
| 265 | NOTHING |
| 275 | NOTHING |
| 285 | WEAK |
| 295 | STRONG |
| 305 | WEAK |

FIG. 7

| DF | 60Hz |
|---|---|
| RF (kHz) | SF:97.1kHz<br>SF*2:194.2kHz<br>SF*3:291.3kHz |
| 145 | NOTHING |
| 155 | NOTHING |
| 165 | NOTHING |
| 175 | WEAK |
| 185 | |
| 195 | |
| 205 | |
| 215 | WEAK |
| 225 | NOTHING |
| 235 | NOTHING |
| 245 | NOTHING |
| 255 | NOTHING |
| 265 | NOTHING |
| 275 | NOTHING |
| 285 | |
| 295 | |
| 305 | |

FIG. 8

| DF | 60Hz | 120Hz | 175Hz |
|---|---|---|---|
| RF (kHz) | SF:97.1kHz<br>SF*2:194.2kHz<br>SF*3:291.3kHz | SF:194.2kHz<br>SF*2:388.4kHz<br>SF*3:582.6kHz | SF:283.3kHz<br>SF*2:566.6kHz<br>SF*3:849.9kHz |
| 145 | NOTHING | WEAK | NOTHING |
| 155 | NOTHING | MEDIUM | NOTHING |
| 165 | NOTHING | MEDIUM | NOTHING |
| 175 | WEAK | MEDIUM | NOTHING |
| 185 | STRONG | STRONG | NOTHING |
| 195 | STRONG | STRONG | NOTHING |
| 205 | MEDIUM | STRONG | NOTHING |
| 215 | WEAK | MEDIUM | NOTHING |
| 225 | NOTHING | WEAK | NOTHING |
| 235 | NOTHING | NOTHING | NOTHING |
| 245 | NOTHING | NOTHING | WEAK |
| 255 | NOTHING | NOTHING | WEAK |
| 265 | NOTHING | NOTHING | WEAK |
| 275 | NOTHING | NOTHING | MEDIUM |
| 285 | WEAK | NOTHING | WEAK |
| 295 | STRONG | NOTHING | NOTHING |
| 305 | WEAK | NOTHING | NOTHING |

FIG. 9

| DF | 60Hz | 120Hz | 175Hz |
|---|---|---|---|
| RF (kHz) | SF:97.1kHz<br>SF*2:194.2kHz<br>SF*3:291.3kHz | SF:194.2kHz<br>SF*2:388.4kHz<br>SF*3:582.6kHz | SF:283.3kHz<br>SF*2:566.6kHz<br>SF*3:849.9kHz |
| 145 | NOTHING | WEAK | NOTHING |
| 155 | NOTHING | MEDIUM | NOTHING |
| 165 | NOTHING | MEDIUM | NOTHING |
| 175 | WEAK | MEDIUM | NOTHING |
| 185 | | | NOTHING |
| 195 | | | NOTHING |
| 205 | | | NOTHING |
| 215 | WEAK | MEDIUM | NOTHING |
| 225 | NOTHING | WEAK | NOTHING |
| 235 | NOTHING | NOTHING | NOTHING |
| 245 | NOTHING | NOTHING | WEAK |
| 255 | NOTHING | NOTHING | WEAK |
| 265 | NOTHING | NOTHING | WEAK |
| 275 | NOTHING | NOTHING | |
| 285 | | NOTHING | |
| 295 | | NOTHING | |
| 305 | | NOTHING | NOTHING |

FIG. 10

| DF | 60Hz | 120Hz | 175Hz |
|---|---|---|---|
| RF (kHz) | SF:97.1kHz<br>SF*2:194.2kHz<br>SF*3:291.3kHz | SF:194.2kHz<br>SF*2:388.4kHz<br>SF*3:582.6kHz | SF:283.3kHz<br>SF*2:566.6kHz<br>SF*3:849.9kHz |
| 145 | NOTHING | WEAK | NOTHING |
| 155 | NOTHING | MEDIUM | NOTHING |
| 165 | NOTHING | MEDIUM | NOTHING |
| 175 | WEAK | MEDIUM | NOTHING |
| 185 | | | |
| 195 | | | |
| 205 | | | |
| 215 | WEAK | MEDIUM | NOTHING |
| 225 | NOTHING | WEAK | NOTHING |
| 235 | NOTHING | NOTHING | NOTHING |
| 245 | NOTHING | NOTHING | WEAK |
| 255 | NOTHING | NOTHING | WEAK |
| 265 | NOTHING | NOTHING | WEAK |
| 275 | | | |
| 285 | | | |
| 295 | | | |
| 305 | | | |

DISPLAY DEVICE, METHOD OF DRIVING THE SAME, AND ELECTRONIC DEVICE

This application claims priority to Korean Patent Application No. 10-2022-0117815, filed on Sep. 19, 2022, and Korean Patent Application No. 10-2022-0135100, filed on Oct. 19, 2022, and all the benefits accruing therefrom under 35 U.S.C. § 119, the content of which in their entirety is herein incorporated by reference.

BACKGROUND

1. Field

Embodiments of the inventive concept relate to a display device, a method of driving the display device, and an electronic device. More particularly, embodiments of the inventive concept relate to a display device applying a power voltage to pixels, a method of driving the display device, and an electronic device.

2. DESCRIPTION OF THE RELATED ART

Generally, a display device may include a display panel, a timing controller, a gate driver, and a data driver. The display panel may include a plurality of gate lines, a plurality of data lines, and a plurality of pixels electrically connected to the gate lines and the data lines. The gate driver may provide gate signals to the gate lines, respectively. The data driver may provide data voltages to the data lines. The timing controller may control the gate driver and the data driver.

The display device may further include a power voltage generator that generates a power voltage for driving the pixels. The power voltage generator may rectify an alternating current ("AC") voltage to generate the power voltage that is a direct current ("DC") voltage.

SUMMARY

Even when an alternating current ("AC") voltage is rectified, an AC component of the power voltage may partially remain as a ripple voltage.

Embodiments of the inventive concept provide a display device that reduces a luminance difference caused by a ripple voltage.

Embodiments of the inventive concept also provide a method of driving the display device.

Embodiments of the inventive concept also provide an electronic device including a display module.

In an embodiment of the inventive concept, a display device may include a display panel including pixels, a gate driver which sequentially applies scan signals to pixel rows including the pixels at a scan frequency, a data driver which applies data voltages to the pixels, a power voltage generator which applies a power voltage to the pixels, and a timing controller which sets a ripple frequency of the power voltage to deviate from the scan frequency by a predetermined reference ratio or more.

In an embodiment, the predetermined reference ratio may be about 5%.

In an embodiment, the timing controller may set the ripple frequency to deviate from an integer multiple of the scan frequency by the predetermined reference ratio or more.

In an embodiment, the power voltage may be applied to a driving transistor included in each of the pixels.

In an embodiment, the power voltage may be applied to a light-emitting element included in each of the pixels.

In an embodiment, the timing controller may vary a driving frequency of the display panel.

In an embodiment, the timing controller may set the ripple frequency to deviate from the scan frequency at the driving frequency of a current frame by the predetermined reference ratio or more.

In an embodiment, the timing controller may set the ripple frequency to deviate from an integer multiple of the scan frequency at the driving frequency of the current frame by the predetermined reference ratio or more.

In an embodiment, the timing controller may set the driving frequency to one of set frequencies, and the timing controller may set the ripple frequency to deviate from the scan frequency at each of the set frequencies by the predetermined reference ratio or more.

In an embodiment, the timing controller may set the ripple frequency to deviate from an integer multiple of the scan frequency at each of the set frequencies by the predetermined reference ratio or more.

By embodiments of the inventive concept, a method of driving a display device may include sequentially applying scan signals to pixel rows at a scan frequency, setting a ripple frequency of a power voltage to deviate from the scan frequency by a predetermined reference ratio or more, and applying the power voltage to pixels included in the pixel rows.

In an embodiment, the predetermined reference ratio may be about 5%.

In an embodiment, the ripple frequency may be set to deviate from an integer multiple of the scan frequency by the predetermined reference ratio or more.

In an embodiment, the power voltage may be applied to a driving transistor included in each of the pixels In an embodiment, the power voltage may be applied to a light-emitting element included in each of the pixels.

In an embodiment, the method may further include varying a driving frequency of a display panel including the pixels.

In an embodiment, the ripple frequency may be set to deviate from the scan frequency at the driving frequency of a current frame by the predetermined reference ratio or more.

In an embodiment, the ripple frequency may be set to deviate from an integer multiple of the scan frequency at the driving frequency of the current frame by the predetermined reference ratio or more.

In an embodiment, the driving frequency may be set to one of set frequencies, and the ripple frequency may be set to deviate from the scan frequency at each of the set frequencies by the predetermined reference ratio or more.

In an embodiment of the inventive concept, an electronic device may include a display module including pixels, a main processor which outputs a synchronization signal to an sub processor, and a sub processor which sets a ripple frequency of a power voltage applied to the pixels to deviate from a scan frequency set to be synchronized with the synchronization signal by a predetermined reference ratio or more.

Therefore, the display device may reduce a luminance difference caused by a ripple voltage by including a display panel including pixels, a gate driver which sequentially applies scan signals to pixel rows including the pixels at a scan frequency, a data driver which applies data voltages to the pixels, a power voltage generator which applies a power voltage to the pixels, and a timing controller which sets a ripple frequency of the power voltage to deviate from the scan frequency by a predetermined reference ratio or more.

In addition, the method of driving the display device may prevent a waterfall phenomenon by reducing a luminance difference caused by a ripple voltage.

However, the effects of the inventive concept are not limited to the above-described effects, and may be variously expanded without departing from the spirit and scope of the inventive concept.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 6 is a table showing a degree to which a waterfall phenomenon is recognized according to a ripple frequency.

FIG. 7 is a table showing an embodiment in which the display device of FIG. 1 sets a ripple frequency.

FIG. 8 is a table showing a degree to which a waterfall phenomenon is recognized according to a ripple frequency.

FIG. 9 is a table illustrating an embodiment in which a display device according to the inventive concept sets a ripple frequency.

FIG. 10 is a table illustrating an embodiment in which a display device according to the inventive concept sets a ripple frequency.

DETAILED DESCRIPTION

Figure 1:
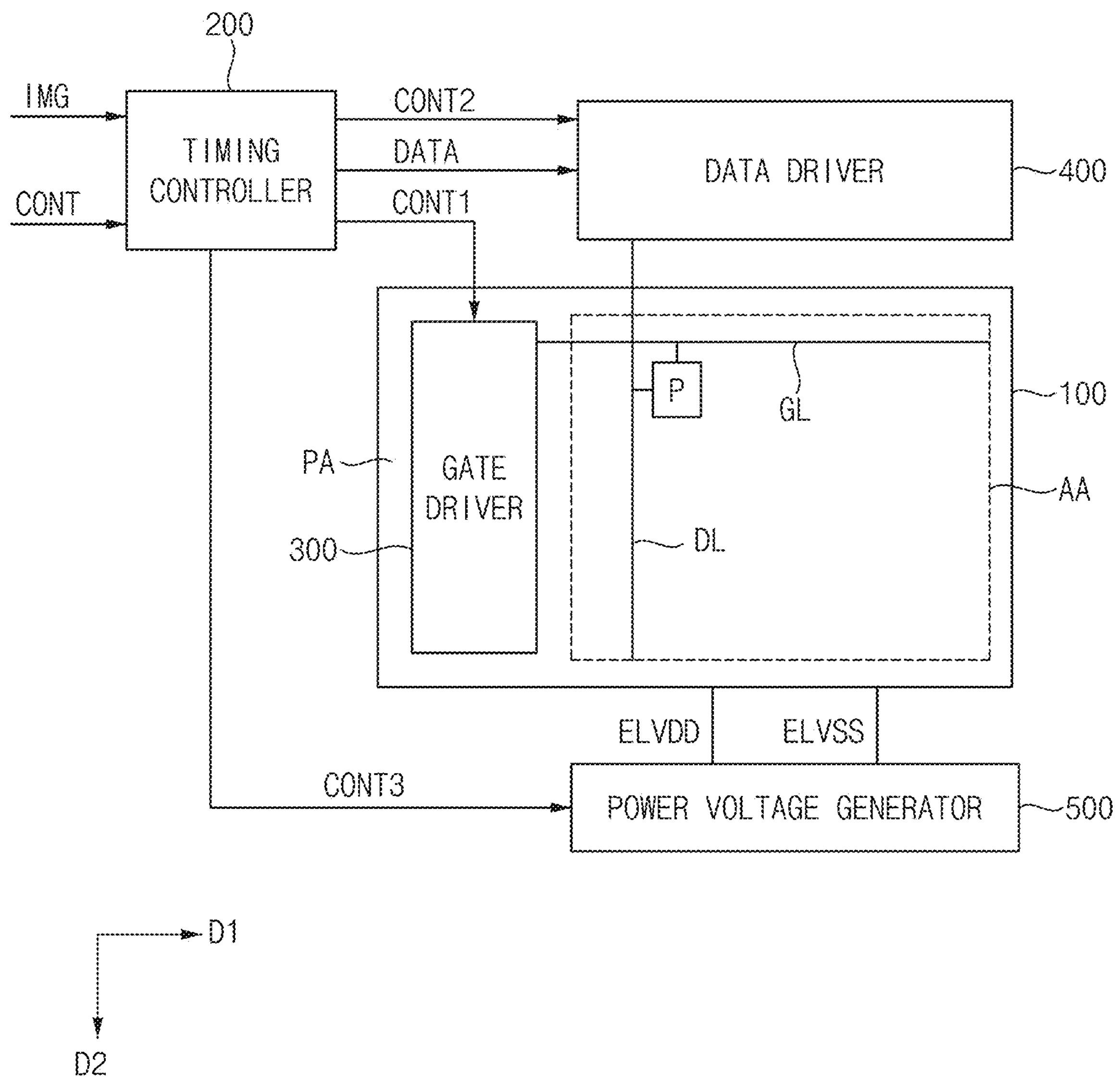
FIG. 1 is a block diagram illustrating an embodiment of a display device according to the inventive concept.

Hereinafter, the inventive concept will be explained in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device according to the inventive concept.

Referring to FIG. 1, the display device may include a display panel 100, a timing controller 200, a gate driver 300, a data driver 400, and a power voltage generator 500. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be disposed (e.g., mounted) on the peripheral region PA of the display panel 100.

The display panel 100 may include a plurality of gate lines GL, a plurality of data lines DL, and a plurality of pixels P electrically connected to corresponding data lines DL and corresponding gate lines GL. The gate lines GL may extend in a first direction D1 and the data lines DL may extend in a second direction D2 crossing the first direction D1.

The timing controller 200 may receive input image data IMG and an input control signal CONT from a main processor (e.g., a graphic processing unit ("GPU")). In an embodiment, the input image data IMG may include red image data, green image data and blue image data, for example. In an embodiment, the input image data IMG may further include white image data. In another embodiment the input image data IMG may include magenta image data, yellow image data, and cyan image data, for example. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The timing controller 200 may generate the third control signal CONT3 for controlling operation of the power voltage generator 500 based on the input control signal CONT and output the third control signal CONT3 to the power voltage generator 500. The third control signal CONT3 may include a signal for a ripple frequency.

The gate driver 300 may generate gate signals (e.g., scan signals) for driving the gate lines GL in response to the first control signal CONT1 input from the timing controller 200. The gate driver 300 may output the gate signals to the gate lines GL. In an embodiment, the gate driver 300 may sequentially output the gate signals to the gate lines GL, for example.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

The power voltage generator 500 may receive the third control signal CONT3 from the timing controller 200. The power voltage generator 500 may generate power voltages ELVDD and ELVSS for driving the pixels P. The power voltage generator 500 may output the power voltages ELVDD and ELVSS to the display panel 100.

Figure 2:
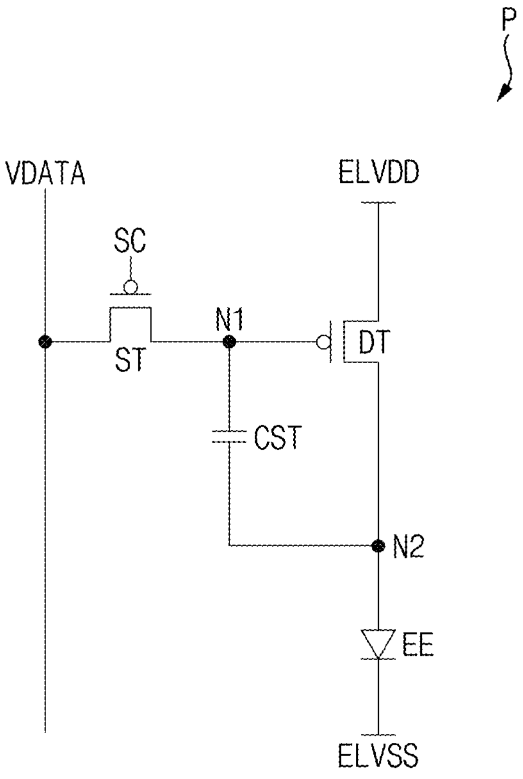
FIG. 2 is a circuit diagram illustrating an embodiment of a pixel of the display device of FIG. 1.

FIG. 2 is a circuit diagram illustrating an embodiment of a pixel of the display device of FIG. 1.

Referring to FIG. 2, each of the pixels P may include a scan transistor ST writing the data voltages VDATA to a storage capacitor CST in response to the scan signal SC, a driving transistor DT receiving a first power voltage ELVDD (e.g., a substantially high power voltage) and generating a driving current corresponding to the written data voltages VDATA, and a light-emitting element EE receiving a second power voltage ELVSS (e.g. a substantially low power voltage) and receiving the driving current to emit light.

In an embodiment, each of the pixels P may include the scan transistor ST including a control electrode receiving the scan signal SC, a first electrode receiving the data voltage VDATA, and a second electrode connected to a first node N1, the driving transistor DT including a control electrode connected to the first node N1, a first electrode receiving the first power voltage ELVDD, and a second electrode connected to a second node N2, the storage capacitor CST including a first electrode connected to the first node N1 and a second electrode connected to the second node N2, and the light-emitting element EE including a first electrode connected to the second node N2 and a second electrode receiving the second power voltage ELVSS, for example.

In this embodiment, it is exemplified that each of the pixels P has a 2T1C structure consisting of two transistors and one capacitor, but the inventive concept is not limited thereto. In an embodiment, each of the pixels P may have a 3T1C structure composed of 3 transistors and 1 capacitor, a 5T2C structure composed of 5 transistors and 2 capacitors, a 7T1C structure composed of 7 transistors and 1 capacitor, a 9T1C structure composed of 9 transistors and 1 capacitor, etc., for example.

In an embodiment, the driving transistor DT may further include a lower electrode. In an embodiment, the lower electrode of the driving transistor DT may be connected to the first electrode of the driving transistor DT, for example.

The scan transistor ST and the driving transistor DT may be implemented as p-channel metal oxide semiconductor ("PMOS") transistors. In this case, a low voltage level may be an activation level, and a high voltage level may be an inactivation level. In an embodiment, when a signal applied to a control electrode of the PMOS transistor has the low voltage level, the PMOS transistor may be turned on, for example. In an embodiment, when a signal applied to the control electrode of the PMOS transistor has the high voltage level, the PMOS transistor may be turned off, for example.

However, the inventive concept is not limited thereto. In an embodiment, the scan transistor ST and the driving transistor DT may be implemented as n-channel metal oxide semiconductor ("NMOS") transistors, for example.

In an embodiment, in an initialization period, the scan signal SC may have the activation level, and the scan transistor ST may be turned on, for example. Accordingly, an initialization voltage may be applied to the first node N1 (i.e., a gate initialization operation). That is, the control electrode of the driving transistor DT (i.e., the storage capacitor CST) may be initialized.

In an embodiment, in a data writing period, the scan signal SC may have the activation level, and the scan transistor ST may be turned on, for example. Accordingly, the data voltage VDATA may be written to the storage capacitor CST (i.e., a data write operation).

In an embodiment, in a light-emitting period, the scan signal SC may have the inactivation level, and the scan transistor ST may be turned off, for example. Accordingly, the driving transistor DT may generate the driving current and the driving current may be applied to the light-emitting element EE (i.e., a light-emitting operation). That is, the light-emitting element EE may emit light with a luminance corresponding to the driving current.

Figure 3:
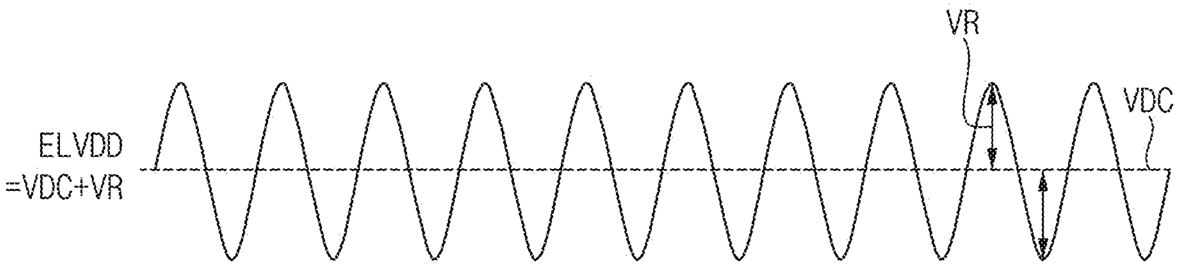
FIG. 3 is a diagram illustrating an embodiment of a first power voltage of the display device of FIG. 1.

FIG. 3 is a diagram illustrating an embodiment of the first power voltage ELVDD of the display device of FIG. 1.

Referring to FIGS. 1 and 3, The power voltage generator 500 may generate the first power voltage ELVDD by rectifying an AC voltage. However, even when the AC voltage is rectified, an AC component of the first power voltage ELVDD may partially remain as a ripple voltage VR in the first power voltage ELVDD. Accordingly, the first power voltage ELVDD may be the sum of a DC voltage VDC and the ripple voltage VR.

The ripple frequency may be a frequency of the ripple voltage VR. Since the first power voltage ELVDD is the sum of the DC voltage VDC having a constant voltage value and the ripple voltage VR, the first power voltage ELVDD may be applied to the pixels P with the ripple frequency.

The power voltage generator 500 may rectify the AC voltage to generate the second power voltage ELVSS. Similar to the first power voltage ELVDD, the AC component of the second power voltage ELVSS may partially remain as the ripple voltage VR.

Figure 4:
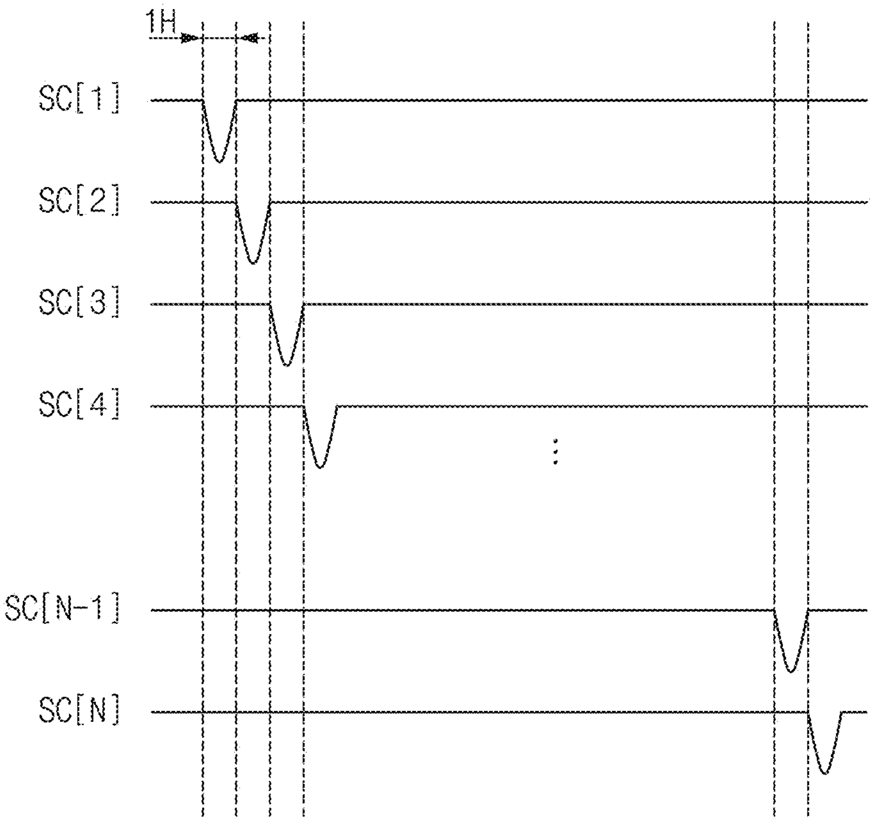
FIG. 4 is a timing diagram illustrating an embodiment of scan signals of the display device of FIG. 1.

FIG. 4 is a timing diagram illustrating an embodiment of the scan signals SC of the display device of FIG. 1.

Referring to FIGS. 1 and 4, the gate driver 300 may sequentially apply the scan signals (SC[1], SC[2], SC[3], SC[4], . . . , SC[N−1], SC[N]) to pixels rows including the pixels P at the scan frequency. Here, N is a positive integer greater than 2.

In an embodiment, the gate driver 300 may apply the scan signal (SC[1], SC[2], SC[3], SC[4], . . . , SC[N−1], SC[N]) to one pixel row every 1 horizontal time 1H, for example. That is, the number of repetitions of one horizontal time 1H per second may be the same as the scan frequency.

As described above, the data voltages may be written to the pixels P in response to the scan signals (SC[1], SC[2], SC[3], SC[4], . . . , SC[N−1], SC[N]). Accordingly, the data voltages may be written to the pixels P of one pixel row every one horizontal time 1H.

In this embodiment, it is exemplified that the gate driver 300 applies the scan signal (SC[1], SC[2], SC[3], SC[4], . . . , SC[N−1], SC[N]) to one pixel row every horizontal time 1H, but the inventive concept is not limited thereto. In an embodiment, the gate driver 300 may apply the scan signals (SC[1], SC[2], SC[3], SC[4], . . . , SC[N−1], SC[N]) to N pixel rows, for example.

Figure 5:
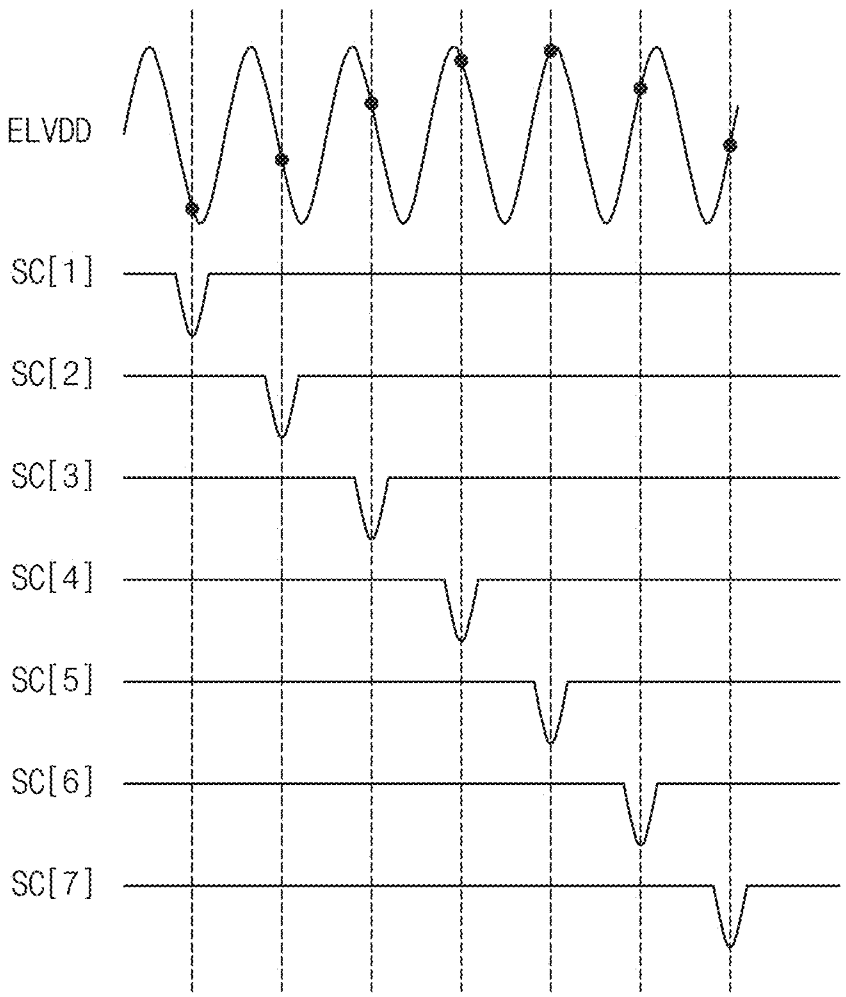
FIG. 5 is a timing diagram illustrating a comparative example of a first power voltage and scan signals.

FIG. 5 is a timing diagram illustrating a comparative example of the first power voltage ELVDD and the scan signals (SC[1], SC[2], SC[3], SC[4], SC[5], SC[6], SC[7]), and FIG. 6 is a table showing a degree to which a waterfall phenomenon is recognized according to the ripple frequency RF.

In FIG. 6, a unit of the ripple frequency RF is kilohertz (kHz), and the degree to which a waterfall phenomenon is recognized is classified into STRONG, MEDIUM, WEAK, and NOTHING. The degree to which the waterfall phenomenon is recognized is strong in the order of STRONG, MEDIUM, WEAK, and NOTHING indicates that the waterfall phenomenon is not recognized.

Here, the waterfall phenomenon may be a phenomenon in which a horizontal line is recognized due to a luminance difference between the pixel rows.

Referring to FIGS. 1 and 5, when the data voltages are written in each of the pixel rows, a voltage value of the first power voltage ELVDD applied to the pixels P may vary. Also, as a voltage difference of the first power voltage ELVDD increases, the luminance difference between the pixel rows may increase.

In an embodiment of FIG. 5, for example, the voltage difference of the first power voltage ELVDD between when the data voltages are written to a first pixel row (i.e., when a scan signal SC[1] applied to the first pixel row has in the activation level) and when the data voltages are written to a fifth pixel row (i.e., when a scan signal SC[5] applied to the fifth pixel row has in the activation level) may be max, for example. Therefore, in FIG. 4, the luminance difference between the first pixel row and the fifth pixel row may be max.

As such, the luminance difference between the pixel rows may be generated between the pixel rows and the waterfall phenomenon may occur due to the luminance difference.

In the comparative example of FIG. 5, the luminance difference caused by the ripple frequency of the first power voltage ELVDD is described, but the luminance difference may also be caused by the ripple frequency of the second power voltage ELVSS.

Referring to FIGS. 1 and 6, the waterfall phenomenon, like a beat phenomenon, may be recognized more strongly as the scan frequency SF and the ripple frequency RF are similar. In addition, the waterfall phenomenon, like the beat phenomenon, may be strongly recognized as a integer multiple of the scan frequency SF and the ripple frequency are similar.

In an embodiment, when the driving frequency DF of the display panel 100 is 60 hertz (Hz), the scan frequency SF may be about 97.1 kHz, for example. Integer multiples of the scan frequency SF may be about 97.1 kHz, about 194.2 kHz, and about 291.3 kHz. As shown in FIG. 6, the waterfall phenomenon may be strongly recognized when the ripple frequencies RF are about 185 kHz, about 195 kHz, and about 295 kHz. That is, the waterfall phenomenon may be strongly recognized at about 185 kHz and about 195 kHz close to twice the scan frequency SF and at about 295 kHz close to three times the scan frequency SF.

Accordingly, in order to prevent the waterfall phenomenon, the display device may set the ripple frequency RF to deviate from the scan frequency SF by a predetermined range or more.

FIG. 7 is a table showing an embodiment in which the display device of FIG. 1 sets the ripple frequency RF.

Referring to FIGS. 1 and 7, the timing controller 200 may set the ripple frequency RF of the power voltages ELVDD and ELVSS to deviate from the scan frequency SF by a predetermined reference ratio or more. The timing controller 200 may set the ripple frequency RF to deviate from an integer multiple of the scan frequency SF by the reference ratio or more. In an embodiment, the reference ratio may be about 5%, for example. When the driving frequency DF of the display panel 100 is about 60 Hz, the scan frequency SF may be about 97.1 kHz. Integer multiples of the scan frequency SF may be about 97.1 kHz, about 194.2 kHz, and about 291.3 kHz. A range of ±5% of about 97.1 kHz may be about 92.2 kHz to about 102 kHz. The ±5% range of about 194.2 kHz may be about 184.5 kHz to about 205 kHz. The ±5% range of about 291.3 kHz may be about 276.6 kHz to about 305.8 kHz. Accordingly, the ripple frequency RF may be set to one of frequencies outside of about 92.2 kHz to about 102 kHz, about 184.5 kHz to about 205 kHz, and about 276.6 kHz to about 305.8 kHz.

In this embodiment, only one, two and three times of the scan frequency SF are exemplified, but the inventive concept is not limited thereto.

In an embodiment, the timing controller 200 may set the ripple frequency RF of the first power voltage ELVDD or the second power voltage ELVSS. In another embodiment, the timing controller 200 may set both the ripple frequencies RF of the first power voltage ELVDD and the second power voltage ELVSS. That is, in order to prevent the waterfall phenomenon, the display device may adjust only the ripple frequency RF of the first power voltage ELVDD, only the ripple frequency RF of the second power voltage ELVSS, or the first and second power voltages ELVDD and ELVSS.

FIG. 8 is a table showing an embodiment of a degree to which the waterfall phenomenon is recognized according to the ripple frequency RF, and FIG. 9 is a table illustrating an embodiment in which a display device according to the inventive concept sets the ripple frequency RF.

The display device in the illustrated embodiment is substantially the same as the display device of FIG. 1 except for varying the driving frequency DF and the ripple frequency RF. Thus, the same reference numerals are used to refer to the same or similar element, and any repetitive explanation will be omitted.

In FIGS. 8 and 9, a unit of the ripple frequency RF is kilohertz (kHz), and the degree to which the waterfall phenomenon is recognized is classified into STRONG, MEDIUM, WEAK, and NOTHING. The degree to which the waterfall phenomenon is recognized is strong in the order of STRONG, MEDIUM, WEAK, and NOTHING indicates that the waterfall phenomenon is not recognized.

Referring to FIGS. 1, 2, 8, and 9, the timing controller 200 may vary the driving frequency DF of the display panel 100. In an embodiment, the timing controller 200 may set the driving frequency DF to one of set frequencies, for example. In an embodiment, the timing controller 200 may set the driving frequency DF to one of about 60 Hz, about 120 Hz, and about 175 Hz, for example.

In this embodiment, it is exemplified that the set frequencies is 60 Hz, 120 Hz, and 175 Hz, but the inventive concept is not limited thereto.

The timing controller 200 may set the ripple frequency RF to deviate from the scan frequency SF at the driving frequency DF of a current frame by a reference ratio or more. The timing controller 200 may set the ripple frequency RF to deviate from an integer multiple of the scan frequency SF at the driving frequency DF of the current frame by the reference ratio or more.

Since the scan signals SC are sequentially applied to the pixel rows at the scan frequency SF, when the driving frequency DF of the display panel 100 changes, the scan frequency SF may also change. Since the scan frequency SF is different, the ripple frequency RF at which the waterfall phenomenon is recognized may also be different. Accordingly, the display device may set the ripple frequency RF according to the driving frequency DF of the current frame.

In an embodiment, the reference ratio may be about 5%, for example. When the driving frequency DF of the current frame is about 60 Hz, the scan frequency SF may be about 97.1 kHz. Integer multiples of the scan frequency SF may be about 97.1 kHz, about 194.2 kHz, and about 291.3 kHz. A range of ±5% of about 97.1 kHz may be about 92.2 kHz to about 102 kHz. The ±5% range of about 194.2 kHz may be about 184.5 kHz to about 205 kHz. The ±5% range of about 291.3 kHz may be about 276.6 kHz to about 305.8 kHz. Accordingly, the ripple frequency RF may be set to one of frequencies outside of about 92.2 kHz to about 102 kHz, about 184.5 kHz to about 205 kHz, and about 276.6 kHz to about 305.8 kHz.

In an embodiment, the reference ratio may be about 5%, for example. When the driving frequency DF of the current frame is about 120 Hz, the scan frequency SF may be about 194.2 kHz. Integer multiples of the scan frequency SF may be about 194.2 kHz, about 388.4 kHz, and about 582.6 kHz. The ±5% range of about 194.2 kHz may be about 184.5 kHz to about 205 kHz. The ±5% range of about 388.4 kHz may be about 369 kHz to about 407.8 kHz. A range of ±5% of about 582.6 kHz may be about 553.5 kHz to about 611.7 kHz. Accordingly, the ripple frequency RF may be set to one of frequencies outside of about 184.5 to about 205 kHz, about 369 to about 407.8 kHz, and about 553.5 to about 611.7 kHz.

In an embodiment, the reference ratio may be about 5%. When the driving frequency DF of the current frame is about 175 Hz, the scan frequency SF may be about 283.3 kHz, for example. Integer multiples of the scan frequency SF may be about 283.3 kHz, about 566.6 kHz, and about 849.9 kHz. The ±5% range of about 283.3 kHz may be about 269.1 kHz to about 297.5 kHz. A range of ±5% of about 566.6 kHz may be about 538.3 kHz to about 594.9 kHz. The ±5% range of about 849.9 kHz may be about 807.4 kHz to about 892.4 kHz. Accordingly, the ripple frequency RF may be set to one of frequencies outside of about 269.1 to about 297.5 kHz, about 538.3 to about 594.9 kHz, and about 807.4 to about 892.4 kHz.

That is, the ripple frequency RF may change as the driving frequency DF varies.

In this embodiment, only one, two and three times of the scan frequency SF are exemplified, but the inventive concept is not limited thereto.

FIG. 10 is a table illustrating an embodiment in which a display device according to the inventive concept sets the ripple frequency RF.

The display device in the illustrated embodiment is substantially the same as the display device of FIG. 9 except that the ripple frequency RF does not vary when the driving frequency DF varies. Thus, the same reference numerals are used to refer to the same or similar element, and any repetitive explanation will be omitted.

In FIG. 10, a unit of the ripple frequency RF is kilohertz (kHz), and the degree to which the waterfall phenomenon is recognized is classified into STRONG, MEDIUM, WEAK, and NOTHING. The degree to which the waterfall phenomenon is recognized is strong in the order of STRONG, MEDIUM, WEAK, and NOTHING indicates that the waterfall phenomenon is not recognized.

Referring to FIGS. 1, 2, and 10, The timing controller 200 may vary the driving frequency DF of the display panel 100. In an embodiment, the timing controller 200 may set the driving frequency DF to one of the set frequencies, for example. In an embodiment, the timing controller 200 may set the driving frequency DF to one of about 60 Hz, about 120 Hz, and about 175 Hz, for example.

In this embodiment, the set frequencies are exemplified as 60 Hz, 120 Hz, and 175 Hz, but the inventive concept is not limited thereto.

The timing controller 200 may set the ripple frequency RF to deviate from the scan frequency SF at each of the set frequencies by the reference ratio or more. The timing controller 200 may set the ripple frequency RF to deviate from an integer multiple of the scan frequency SF at each of the set frequencies by the reference ratio or more.

Since the scan signals SC are sequentially applied to the pixel rows at the scan frequency SF, when the driving frequency DF of the display panel 100 changes, the scan frequency SF may also change. Since the scan frequency SF is different, the ripple frequency RF at which the waterfall phenomenon is recognized may also be different. Accordingly, the display device may set the ripple frequency RF in consideration of all frequencies that may be the driving frequency DF (i.e., the set frequencies).

In an embodiment, the reference ratio may be about 5%, for example. When the set frequencies are about 60 Hz, about 120 Hz, and about 175 Hz, frequencies that may be the scan frequency SF may be about 97.1 kHz, about 194.2 kHz, and about 283.3 kHz. Frequencies that may be integer multiples of the scan frequency SF may be about 97.1 kHz, about 194.2 kHz, about 283.3 kHz, about 291.3 kHz, about 388.4 kHz, about 566.6 kHz, about 582.6 kHz, and about 849.9 kHz. A range of ±5% of about 97.1 kHz may be about 92.2 kHz to about 102 kHz. The ±5% range of about 194.2 kHz may be about 184.5 kHz to about 205 kHz. The ±5% range of about 283.3 kHz may be about 269.1 kHz to about 297.5 kHz. The ±5% range of about 291.3 kHz may be about 276.6 kHz to about 305.8 kHz. The ±5% range of about 388.4 kHz may be about 369 kHz to about 407.8 kHz. A range of ±5% of about 566.6 kHz may be about 538.3 kHz to about 594.9 kHz. A range of ±5% of about 582.6 kHz may be about 553.5 kHz to about 611.7 kHz. The ±5% range of about 849.9 kHz may be about 807.4 kHz to about 892.4 kHz. Therefore, the ripple frequency RF may be set to one of frequencies outside about 92.2 kHz to about 102 kHz, about 184.5 kHz to about 205 kHz, about 269.1 kHz to about 297.5 kHz, about 276.6 kHz to about 305.8 kHz, about 369 kHz to about 407.8 kHz, about 538.3 kHz to about 594.9 kHz, about 553.5 kHz to about 611.7 kHz, and about 807.4 kHz to about 892.4 kHz.

That is, the ripple frequency RF may change as the driving frequency DF varies.

In this embodiment, only one, two and three times of the scan frequency SF are exemplified, but the inventive concept is not limited thereto.

Figure 11:
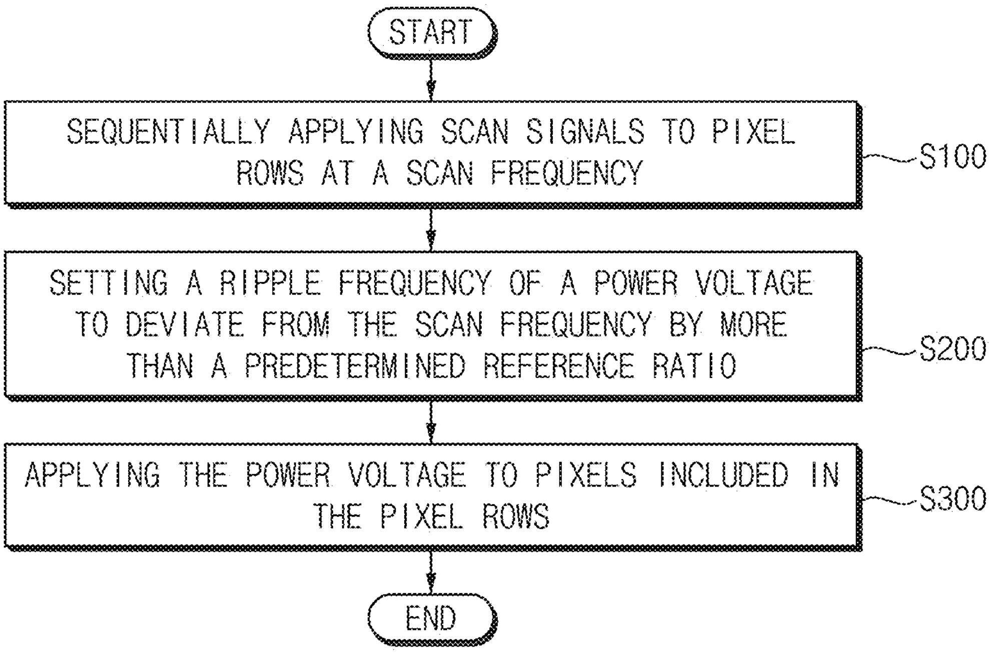
FIG. 11 is a flowchart illustrating an embodiment of a method of driving a display device according to the inventive concept.

FIG. 11 is a flowchart illustrating an embodiment of a method of driving a display device according to the inventive concept.

Referring to FIG. 11, the method of FIG. 11 may include sequentially applying the scan signals to the pixel rows at the scan frequency (S100), setting the ripple frequency of the power voltage to deviate from the scan frequency by the predetermined reference ratio or more (S200), and applying the power voltage to the pixels included in the pixel rows (S300).

In an embodiment, the driving frequency described below may be set to be synchronized with the vertical synchronizing signal, for example. In an embodiment, the scan frequency described later may be set to be synchronized with the horizontal synchronizing signal, for example.

Specifically, the method of FIG. 11 may include sequentially applying the scan signals to the pixel rows at the scan frequency (S100). The data voltages may be written to the pixels in response to the scan signals.

In an embodiment, each of the pixels may include the scan transistor writing the data voltages to the storage capacitor in response to the scan signal, the driving transistor receiving the first power voltage and generating the driving current corresponding to the written data voltages, and the light-emitting element receiving the second power voltage and receiving the driving current to emit light, for example.

Specifically, the method of FIG. 11 may include setting the ripple frequency of the power voltage to deviate from the scan frequency by the predetermined reference ratio or more (S200). The ripple frequency may be set to deviate from an integer multiple of the scan frequency by the reference ratio or more. In an embodiment, the reference ratio may be about 5%.

In an embodiment, the method of FIG. 11 may vary the driving frequency of the display panel including the pixels, for example. In an embodiment, the driving frequency may be set to one of the set frequencies, for example.

In an embodiment, the ripple frequency may be set to deviate from the scan frequency of the driving frequency of the current frame by the reference ratio or more. The ripple frequency may be set to deviate from an integer multiple of the scan frequency of the driving frequency of the current frame by the reference ratio or more. That is, the ripple frequency may vary as the driving frequency varies.

In an embodiment, the ripple frequency may be set to deviate from the scan frequency at each of the set frequencies by the reference ratio or more. The ripple frequency may be set to deviate from an integer multiple of the scan frequency at each of the set frequencies by the reference ratio or more. That is, the ripple frequency may not vary as the driving frequency varies.

In this illustrated embodiments, sequentially scanning the pixel rows is exemplified, but the inventive concept is not limited thereto. In an embodiment, the scan signals may be sequentially applied to pixel columns at the scan frequency, for example. In this case, the display device in the embodiments of the inventive concept may prevent a waterfall phenomenon in which a vertical line is recognized.

Also, in the illustrated embodiments, it is exemplified that the timing controller sets the ripple frequency of the power voltage, but the inventive concept is not limited thereto.

Figure 12:
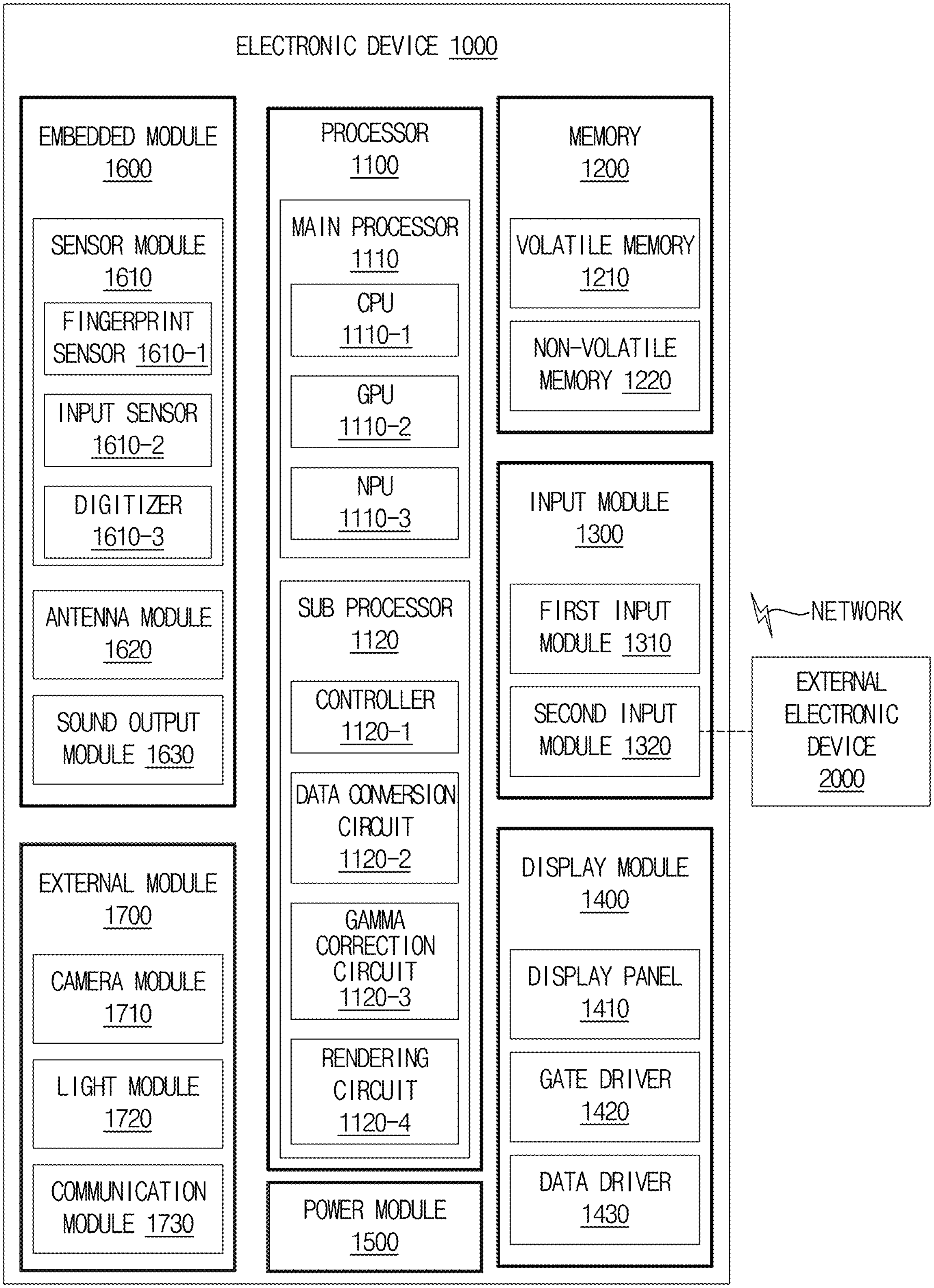
FIG. 12 is a block diagram showing an embodiment of an electronic device according to the inventive concept.
Figure 13:
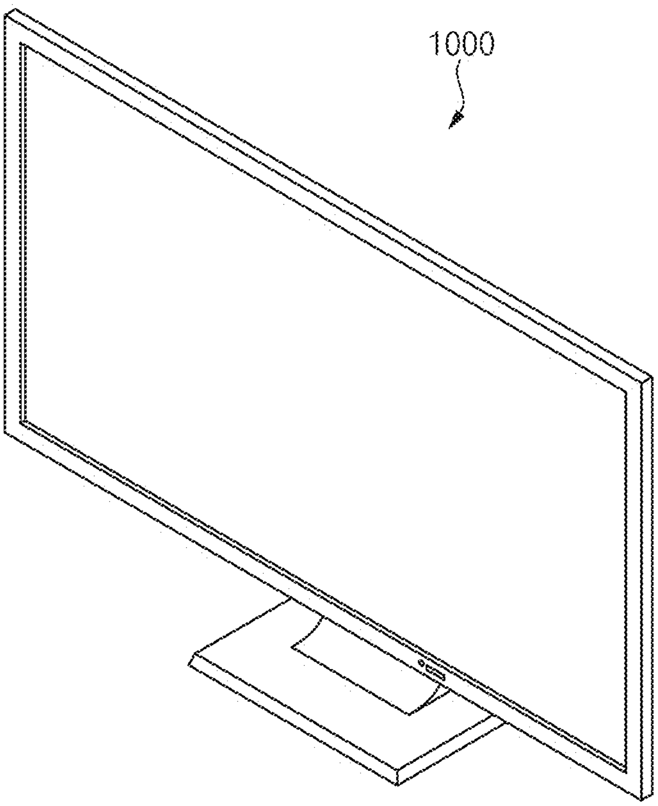
FIG. 13 is a diagram showing an embodiment in which the electronic device of FIG. 12 is implemented as a television.

FIG. 12 is a block diagram showing an embodiment of an electronic device according to the inventive concept, and FIG. 13 is a diagram showing an embodiment in which the electronic device of FIG. 11 is implemented as a television.

Referring to FIGS. 12 and 13, the electronic device 1000 may output various information through a display module 1400 within an operating system. When a processor 1100 executes an application stored in a memory 1200, the display module 1400 may provide application information to a user through the display panel 1410. In this case, the display panel 1410 may be the display panel of FIG. 1.

In an embodiment, as shown in FIG. 13, the electronic device 1000 may be implemented as a television. However, the electronic device 1000 is not limited thereto. In an embodiment, the electronic device 1000 may be implemented as a cellular phone, a video phone, a smart pad, a smart watch, a tablet personal computer ("PC"), a car navigation system, a computer monitor, a laptop, a head mounted display ("HMD") device, etc., for example.

The processor 1100 may obtain an external input through an input module 1300 or a sensor module 1610 and execute an application corresponding to an external input. In an embodiment, when the user selects a camera icon displayed on the display panel 1410, the processor 1100 may obtain a user input through an input sensor 1610-2 and activate a camera module 1710. The processor 1100 may transmit a data signal corresponding to a photographed image acquired through the camera module 1710 to the display module 1400. The display module 1400 may display an image corresponding to the photographed image through the display panel 1410.

In another embodiment, when personal information authentication is executed in the display module 1400, a fingerprint sensor 1610-1 may obtain input fingerprint information as input data. The processor 1100 may compare the input data acquired through the fingerprint sensor 1610-1 with authentication data stored in the memory 1200, and execute the application according to a comparison result.

The display module 1400 may display information executed according to application logic through the display panel 1410.

In another embodiment, when a music streaming icon displayed on the display module 1400 is selected, the processor 1100 may obtain the user input through the input sensor 1610-2 and activate a music streaming application stored in the memory 1200. When a music execution command is input in the music streaming application, the processor 1100 may activate a sound output module 1630 to provide sound information corresponding to the music execution command to the user.

In the above, operation of the electronic device 1000 has been briefly described. Hereinafter, components of the electronic device 1000 will be described in detail. Some of components of the electronic device 1000 described later may be integrated and provided as one component, or one component may be provided separately as two or more components.

The electronic device 1000 may communicate with an external electronic device 2000 through a network (e.g., a short-distance wireless communication network or a long-distance wireless communication network). In an embodiment, the electronic device 1000 may include the processor 1100, the memory 1200, the input module 1300, the display module 1400, a power module 1500, an embedded module 1600, and an external module 1700. In an embodiment, in the electronic device 1000, at least one of the above-described components may be omitted or one or more other components may be added. In an embodiment, some of components (e.g., the sensor module 1610, an antenna module 1620, or the sound output module 1630) may be integrated into another component (e.g., the display module 1400).

The processor 1100 may execute software to control at least one other component (e.g., hardware or software component) of the electronic device 1000 connected to the processor 1100, and perform various data processing or calculations. In an embodiment, as at least part of the data processing or calculation, the processor 1100 may store commands or data received from other components (e.g., the input module 1300, the sensor module 1610, or the communication module 1730) in a volatile memory 1210, and process the commands or data stored in the volatile memory 1210, and resulting data may be stored in a non-volatile memory 1220.

The processor 1100 may include a main processor 1110 and an sub processor 1120. The main processor 1110 may include one or more of a central processing unit ("CPU") 1110-1 or an application processor ("AP"). The main processor 1110 may further include any one or more of the graphic processing unit ("GPU") 1110-2, a communication processor ("CP"), and an image signal processor ("ISP"). The main processor 1110 may further include a neural processing unit ("NPU") 1110-3. The neural network processing unit may be a processor specialized in processing an artificial intelligence model, and the artificial intelligence model may be generated through machine learning. The artificial intelligence model may include a plurality of artificial neural network layers. Artificial neural networks may include deep neural networks ("DNNs"), convolutional neural networks ("CNNs"), recurrent neural networks ("RNNs"), restricted Boltzmann machines ("RBMs"), deep belief networks ("DBNs"), bidirectional recurrent deep neural networks ("BRDNNs"), deep Q-networks or a combination of two or more of the foregoing, but is not limited to the above embodiments. The artificial intelligence model may include, in addition or alternatively, a software structure in addition to a hardware structure. At least two of the above-described processing unit and processor may be implemented as an integrated component (e.g., a single chip) or each may be implemented as an independent component (e.g., a plurality of chips).

The sub processor 1120 may include a controller 1120-1. The controller 1120-1 may include an interface conversion circuit and a timing control circuit. The controller 1120-1 may receive the input image data from the main processor 1110, convert a data format of the input image data to meet interface specifications with the display module 1400, and output the data signal. The controller 1120-1 may output various control signals desired for driving the display module 1400.

The sub processor 1120 may further include a data conversion circuit 1120-2, a gamma correction circuit 1120-3, a rendering circuit 1120-4, or the like. The data conversion circuit 1120-2 may receive the data signal from the controller 1120-1 and compensate for the data signal so that an image is displayed with a desired luminance according to characteristics of the electronic device 1000 or a user's setting, or convert the data signal to reduce power consumption or compensate for afterimages. The gamma correction circuit 1120-3 may convert the data signal or the gamma reference voltage so that an image displayed on the electronic device 1000 has desired gamma characteristics. The rendering circuit 1120-4 may receive the data signal from the controller 1120-1 and render the data signal in consideration of a pixel arrangement of the display panel 1410 applied to the electronic device 1000. At least one of the data conversion circuit 1120-2, the gamma correction circuit 1120-3, and the rendering circuit 1120-4 may be integrated into other components (e.g., the main processor 1110 or the controller 1120-1).

At least one of the controller 1120-1, the data conversion circuit 1120-2, the gamma correction circuit 1120-3, and the rendering circuit 1120-4 may be integrated into a data driver 1430 described later.

In this case, the sub processor 1120 may be the timing controller of FIG. 1.

The memory 1200 may store various data used by at least one component (e.g., the processor 1100 or the sensor module 1610) of the electronic device 1000 and input data or output data for commands related the various data. The memory 1200 may include at least one of the volatile memory 1210 and the non-volatile memory 1220.

The input module 1300 may receive commands or data to be used for components (e.g., the processor 1100, the sensor module 1610 or the sound output module 1630) of the electronic device 1000 from outside the electronic device 1000 (e.g., the user or the external electronic device 2000).

The input module 1300 may include a first input module 1310 into which the command or data is input from the user and a second input module 1320 into which the command or data is input from the external electronic device 2000. The first input module 1310 may include a microphone, a mouse, a keyboard, a key (e.g., a button), or a pen (e.g., a passive pen or an active pen). The second input module 1320 may support a designated protocol capable of connecting to the external electronic device 2000 by wire or wirelessly. In an embodiment, the second input module 1320 may include a high definition multimedia interface ("HDMI"), a universal serial bus ("USB") interface, a secure digital ("SD") card interface, or an audio interface. The second input module 1320 may include a connector that may be physically connected to the external electronic device 2000, e.g., an HDMI connector, a USB connector, an SD card connector, or an audio connector (e.g., a headphone connector).

The display module 1400 may visually provide information to the user. The display module 1400 may include the display panel 1410, the gate driver 1420, and the data driver 1430. The display module 1400 may further include a window, a chassis, and a bracket to protect the display panel 1410. In this case, the gate driver 1420 and the data driver 1430 may be the gate driver 300 and data driver 400 of FIG. 1.

The display panel 1410 may include a liquid crystal display panel, an organic light-emitting display panel, or an inorganic light-emitting display panel, and the type of display panel 1410 is not particularly limited. The display panel 1410 may be a rigid type or a flexible type capable of being rolled or folded. The display module 1400 may further include a supporter, a bracket, or a heat dissipation member that supports the display panel 1410.

The gate driver 1420 may be disposed (e.g., mounted) on the display panel 1410 as a driving chip. Also, the gate driver 1420 may be integrated into the display panel 1410. In an embodiment, the gate driver 1420 may include an amorphous silicon thin film transistor ("TFT") gate driver circuit ("ASG"), a substantially low temperature polycrystalline silicon ("LTPS") TFT gate driver circuit, or an oxide semiconductor TFT gate driver circuit ("OSG") internalized in the display panel 1410, for example. The gate driver 1420 may receive a control signal from the controller 1120-1 and output the gate signals to the display panel 1410 in response to the control signal.

The display panel 1410 may further include an emission driver. The emission driver may output an emission signal to the display panel 1410 in response to the control signal received from the controller 1120-1. The emission driver may be formed separately from the gate driver 1420 or integrated into the gate driver 1420.

The data driver 1430 may receive a control signal from the controller 1120-1, convert the data signal into an analog voltage (e.g., the data voltage) in response to the control signal, and then output the data voltages to the display panel 1410.

The data driver 1430 may be integrated into other components (e.g., the controller 1120-1). The functions of the interface conversion circuit and the timing control circuit of the controller 1120-1 described above may be integrated into the data driver 1430.

The display module 1400 may further include a light driver and a voltage generating circuit. The voltage generating circuit may output various voltages desired for driving the display panel 1410.

The power module 1500 may supply power to components of the electronic device 1000. The power module 1500 may include a battery that charges a power voltage. A battery may include a non-rechargeable primary cell, a rechargeable secondary cell or a fuel cell. The power module 1500 may include a power management integrated circuit ("PMIC"). The PMIC may supply optimized power to each of the above-described modules and modules described later. The power module 1500 may include a wireless power transmission/reception member electrically connected to the battery. The wireless power transmission/reception member may include a plurality of antenna radiators in the form of coils.

The electronic device 1000 may further include the embedded module 1600 and the external module 1700. The embedded module 1600 may include the sensor module 1610, the antenna module 1620, and the sound output module 1630. The external module 1700 may include the camera module 1710, a light module 1720, and the communication module 1730.

The sensor module 1610 may detect an input by a user's body or an input by a pen among the first input module 1310, and generate an electrical signal or data value corresponding to the input. The sensor module 1610 may include at least one of the fingerprint sensor 1610-1, the input sensor 1610-2, and a digitizer 1610-3.

The fingerprint sensor 1610-1 may generate a data value corresponding to the user's fingerprint. The fingerprint sensor 1610-1 may include either an optical or capacitive fingerprint sensor.

The input sensor 1610-2 may generate data values corresponding to coordinate information of an input by a user's body or a pen. The input sensor 1610-2 may generate a capacitance change due to the input as the data value. The input sensor 1610-2 may detect the input by the passive pen or transmit/receive data to/from the active pen.

The input sensor 1610-2 may measure a biosignal such as blood pressure, moisture, or body fat. In an embodiment, when the user touches a part of his body to a sensor layer or sensing panel and does not move for a predetermined period of time, the input sensor 1610-2 may detect the biosignal based on a change in electric field caused by the part of the user's body, for example. Information desired by the user may be output to the display module 1400.

The digitizer 1610-3 may generate data values corresponding to coordinate information input by the pen. The digitizer 1610-3 may generate the amount of electromagnetic change by the input as the data value. The digitizer 1610-3 may detect the input by the passive pen or transmit/receive data to/from the active pen.

At least one of the fingerprint sensor 1610-1, the input sensor 1610-2, and the digitizer 1610-3 may be implemented as the sensor layer formed on the display panel 1410 through a continuous process. The fingerprint sensor 1610-1, the input sensor 1610-2, and the digitizer 1610-3 may be disposed above the display panel 1410, and any one of the fingerprint sensor 1610-1, the input sensor 1610-2, and the digitizer 1610-3, e.g., the digitizer 1610-3 may be disposed below the display panel 1410.

At least two or more of the fingerprint sensor 1610-1, the input sensor 1610-2, and the digitizer 1610-3 may be integrated into one sensing panel through the same process. When integrated into one sensing panel, the sensing panel may be disposed between the display panel 1410 and the window disposed above the display panel 1410. In an embodiment, the sensing panel may be disposed on the window, and the location of the sensing panel is not particularly limited.

At least one of the fingerprint sensor 1610-1, the input sensor 1610-2, and the digitizer 1610-3 may be embedded in the display panel 1410. That is, at least one of the fingerprint sensor 1610-1, the input sensor 1610-2, and the digitizer 1610-3 may be simultaneously formed through a process of forming elements (e.g., light-emitting elements, transistors, etc.) included in the display panel 1410.

In addition, the sensor module 1610 may generate an electrical signal or data value corresponding to an internal state or an external state of the electronic device 1000. The sensor module 1610 may be further included, e.g., a gesture sensor, a gyro sensor, a barometric pressure sensor, a magnetic sensor, an acceleration sensor, a grip sensor, a proximity sensor, a color sensor, an infrared ("IR") sensor, a biosensor, a temperature sensor, a humidity sensor, or an illuminance sensor.

The antenna module 1620 may include one or more antennas for transmitting or receiving signals or power to the outside. In an embodiment, the communication module 1730 may transmit a signal to an external electronic device or receive a signal from an external electronic device through an antenna suitable for a communication method. The antenna pattern of the antenna module 1620 may be integrated into one component of the display module 1400 (e.g., the display panel 1410) or the input sensor 1610-2.

The sound output module 1630 may be a device for outputting a sound signal to the outside of the electronic device 1000, and include, e.g., a speaker used for general purposes such as multimedia playback or recording playback and a receiver used exclusively for receiving calls. In an embodiment, the receiver may be formed integrally with or separately from the speaker. A sound output pattern of the sound output module 1630 may be integrated with the display module 1400.

The camera module 1710 may capture still images and moving images. In an embodiment, the camera module 1710 may include one or more lenses, image sensors, or image signal processors. The camera module 1710 may further include an infrared camera capable of measuring the presence or absence of the user, the user's location, and the user's line of sight.

The light module 1720 may provide light. The light module 1720 may include a light-emitting diode or a xenon lamp. The light module 1720 may operate in conjunction with the camera module 1710 or operate independently.

The communication module 1730 may support establishing a wired or wireless communication channel between the electronic device 1000 and the external electronic device 2000 and performing communication through the established communication channel. The communication module 1730 may include one or all of be a wireless communication module such as a cellular communication module, a short-range wireless communication module, or a global navigation satellite system ("GNSS") communication module, and a wired communication module such as a local area network ("LAN") communication module or a power line communication module. The communication module 1730 may communicate with the external electronic device 2000 through a short-range communication network such as Bluetooth™, Wi-Fi direct, or infrared data association ("IrDA") or a long-distance communication network such as a cellular network, the Internet, or a computer network (e.g., LAN or wide area network ("WAN")). The various types of communication modules 1730 described above may be implemented as a single chip or may be implemented as separate chips.

The input module 1300, the sensor module 1610, the camera module 1710, or the like may be used to control the operation of the display module 1400 in conjunction with the processor 1100.

The processor 1100 may output commands or data to the display module 1400, the sound output module 1630, the camera module 1710, or the light module 1720 based on input data received from the input module 1300. In an embodiment, the processor 1100 may generate a data signal corresponding to input data applied through the mouse or the active pen and output the data signal to the display module 1400 or generate command data corresponding to input data and output the command data to the camera module 1710 or the light module 1720. When the input data is not received from the input module 1300 for a predetermined period of time, the processor 1100 may convert an operation mode of the electronic device 1000 into a substantially low power mode or a sleep mode to reduce power consumption.

The processor 1100 may output commands or data to the display module 1400, the sound output module 1630, the camera module 1710, or the light module 1720 based on sensing data received from the sensor module 1610. In an embodiment, the processor 1100 may compare authentication data applied by the fingerprint sensor 1610-1 with authentication data stored in the memory 1200, and then execute an application according to the comparison result, for example. The processor 1100 may execute a command or output a corresponding data signal to the display module 1400 based on the sensing data sensed by the input sensor 1610-2 or the digitizer 1610-3. When the sensor module 1610 includes a temperature sensor, the processor 1100 may receive temperature data about the temperature measured from the sensor module 1610 and further perform luminance correction on the data signal based on the temperature data.

The processor 1100 may receive measurement data about the presence or absence of the user, the user's location, and the user's gaze from the camera module 1710. The processor 1100 may further perform luminance correction on the data signal based on the measurement data. In an embodiment, the processor 1100 that determines whether or not there is the user through an input from the camera module 1710 may output a data signal whose luminance is corrected through the data conversion circuit 1120-2 or the gamma correction circuit 1120-3 to the display module 1400, for example.

Some of the components may be connected to each other through communication method such as a bus, general purpose input/output ("GPIO"), serial peripheral interface ("SPI"), mobile industry processor interface ("MIPI"), or ultra-path interconnect ("UPI") link between peripheral devices to exchange signals (e.g., commands or data) with each other. In an embodiment, any one of the above-described communication methods may be used, and is not limited to the above-described communication method.

The inventive concepts may be applied to any electronic device including the display device. In an embodiment, the inventive concepts may be applied to a television ("TV"), a digital TV, a three dimensional ("3D") TV, a mobile phone, a smart phone, a tablet computer, a virtual reality ("VR") device, a wearable electronic device, a PC, a home appliance, a laptop computer, a personal digital assistant ("PDA"), a portable multimedia player ("PMP"), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the illustrative embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device comprising:

a display panel including pixels;

a gate driver which sequentially applies scan signals to pixel rows including the pixels at a scan frequency;

a data driver which applies data voltages to the pixels;

a power voltage generator which applies a power voltage to the pixels; and a timing controller which sets a ripple frequency of the power voltage to be larger than the scan frequency and to deviate from a positive integer multiple of the scan frequency by the predetermined reference ratio or more, wherein the integer has a value of three or less, wherein the timing controller is further configured to exclude any ripple frequency that lies within ±k % of any positive integer multiple of the scan frequency, such that the ripple frequency is not within ±k % of any positive integer multiple of the scan frequency, where k is greater than zero and denotes the predetermined reference ratio.

2. The display device of claim 1, wherein the predetermined reference ratio is about 5%.

3. The display device of claim 1, wherein the power voltage is applied to a driving transistor included in each of the pixels.

4. The display device of claim 1, wherein the power voltage is applied to a light-emitting element included in each of the pixels.

5. The display device of claim 1, wherein the timing controller varies a driving frequency of the display panel.

6. The display device of claim 5, wherein the timing controller sets the ripple frequency to deviate from the scan frequency at the driving frequency of a current frame by the predetermined reference ratio or more.

7. The display device of claim 6, wherein the timing controller sets the ripple frequency to deviate from an integer multiple of the scan frequency at the driving frequency of the current frame by the predetermined reference ratio or more.

8. The display device of claim 5, wherein the timing controller sets the driving frequency to one of set frequencies, and wherein the timing controller sets the ripple frequency to deviate from the scan frequency at each of the set frequencies by the predetermined reference ratio or more.

9. The display device of claim 8, wherein the timing controller sets the ripple frequency to deviate from an integer multiple of the scan frequency at each of the set frequencies by the predetermined reference ratio or more.

10. The display device of claim 1, wherein the scan frequency is calculated as 1,618.33 times a driving frequency of the display panel.

11. The display device of claim 1, wherein the timing controller stores a plurality of pairs of driving frequencies and corresponding ripple frequencies, and is configured to automatically select and apply a ripple frequency from the stored pairs in response to a change in the driving frequency of the display panel.

12. A method of driving a display device, the method comprising:

sequentially applying scan signals to pixel rows at a scan frequency;

setting a ripple frequency of a power voltage to deviate from the scan frequency by a predetermined reference ratio or more; and applying the power voltage to pixels included in the pixel rows, wherein the ripple frequency is set to be larger than the scan frequency and to deviate from a positive integer multiple of the scan frequency by the predetermined reference ratio or more, and wherein the integer has a value of three or less, wherein the timing controller is further configured to exclude any ripple frequency that lies within ±k % of any positive integer multiple of the scan frequency, such that the ripple frequency is not within ±k % of any positive integer multiple of the scan frequency, where k is greater than zero and denotes the predetermined reference ratio.

13. The method of claim 12, wherein the predetermined reference ratio is about 5%.

14. The method of claim 12, wherein the power voltage is applied to a driving transistor included in each of the pixels.

15. The method of claim 11, wherein the power voltage is applied to a light-emitting element included in each of the pixels.

16. The method of 11, further comprising:

varying a driving frequency of a display panel including the pixels.

17. The method of claim 16, wherein the ripple frequency is set to deviate from the scan frequency at the driving frequency of a current frame by the predetermined reference ratio or more.

18. The method of claim 17, wherein the ripple frequency is set to deviate from an integer multiple of the scan frequency at the driving frequency of the current frame by the predetermined reference ratio or more.

19. The method of claim 16, wherein the driving frequency is set to one of set frequencies, and wherein the ripple frequency is set to deviate from the scan frequency at each of the set frequencies by the predetermined reference ratio or more.

20. The method of claim 16, wherein the scan frequency is calculated as 1,618.33 times a driving frequency of the display panel.

21. The method of claim 12, further comprising storing a plurality of pairs of driving frequencies and corresponding ripple frequencies, and automatically selecting and applying a ripple frequency from the stored pairs in response to a change in the driving frequency of the display panel.

22. A electronic device comprising:

a display module including pixels;

a main processor which outputs a synchronization signal; and a sub processor which receives the synchronization signal and sets a ripple frequency of a power voltage applied to the pixels to deviate from a scan frequency set to be synchronized with the synchronization signal by a predetermined reference ratio or more, wherein the sub processor sets the ripple frequency is set to be larger than the scan frequency and to deviate from a positive integer multiple of the scan frequency by the predetermined reference ratio or more, and wherein the integer has a value of three or less, wherein the timing controller is further configured to exclude any ripple frequency that lies within ±k % of any positive integer multiple of the scan frequency, such that the ripple frequency is not within ±k % of any positive integer multiple of the scan frequency, where k is greater than zero and denotes the predetermined reference ratio.

23. The electronic device of claim 22, wherein the sub processor stores a plurality of pairs of driving frequencies and corresponding ripple frequencies, and is configured to automatically select and apply a ripple frequency from the stored pairs in response to a change in the driving frequency of the display module.

* * * * *